SUPPORT FOR REAR VISION MIRROR
Filed Oct. 15, 1965
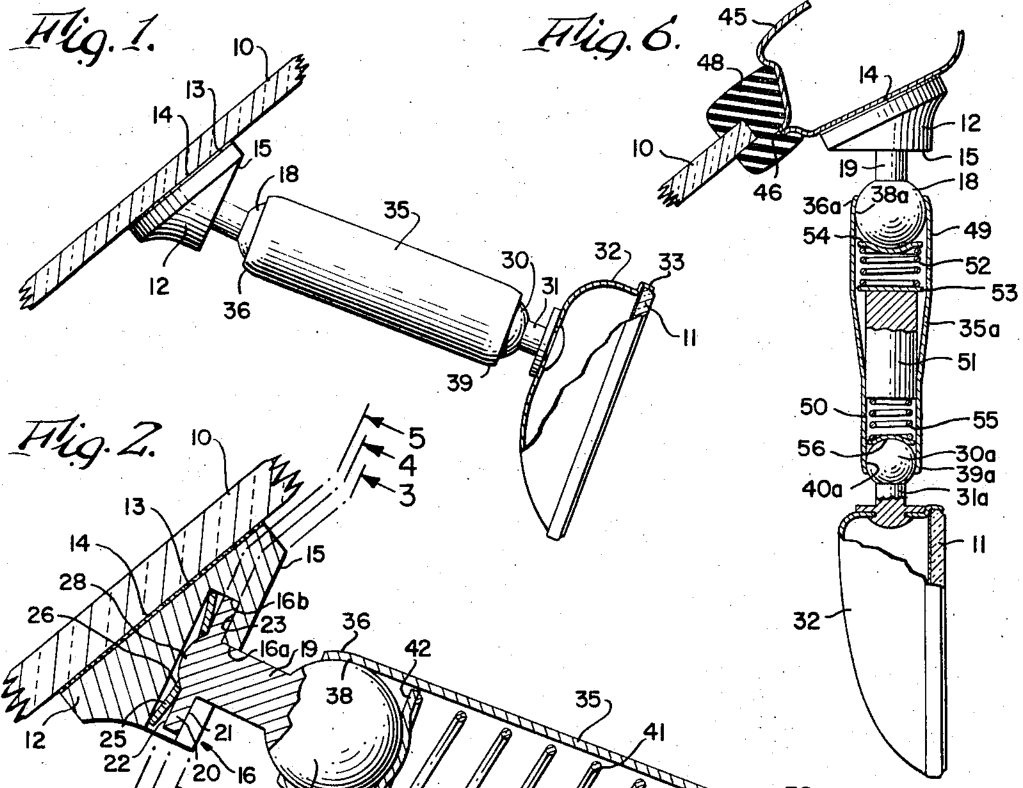
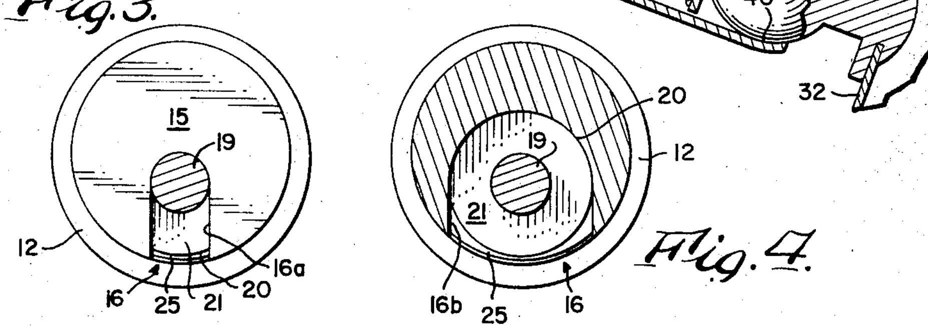
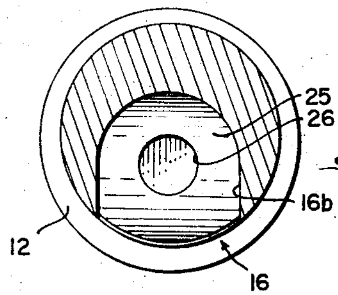
INVENTORS
William G. Bausch
Ronald C. Perison, Sr.
BY
Popp and Sommer
ATTORNEYS

United States Patent Office 3,367,616
Patented Feb. 6, 1968

3,367,616

SUPPORT FOR REAR VISION MIRROR

William G. Bausch, West Falls, and Ronald C. Perison, Sr., East Aurora, N.Y., assignors to Standard Mirror Company, Inc., Buffalo, N.Y., a corporation of New York Filed Oct. 15, 1965, Ser. No. 496,454
8 Claims. (Cl. 248—483)

ABSTRACT OF THE DISCLOSURE

For supporting a rear vision mirror panel from a glass windshield, a small base has one face cemented to the windshield and has an undercut slot in its opposite face extending from one side to its center. A ball and socket mount for the panel includes a plate fixed to a neck of the ball and slidable into the undercut slot, with the neck protruding outwardly therefrom. A concave spring plate in the slot between the base and the plate retains the latter in fixed position. Another feature is including a one piece tube with a ball housed in each end and with each end formed to provide a socket by magnetic field forming, swaging or roll forming each end against the ball in place. A central wooden block and two helical compression springs and followers in the tube bias the balls apart and provide the required friction against losing adjustment from body vibrations.

*Summary of invention*

The invention resides in such undercut slotted base in which the plate of the ball support is held by a spring between the base and plate and also in the above magnetic field forming of a one piece tube to have internal sockets for balls at its opposite ends. The invention also comprehends the above wooden block and double helical spring and follower group in the tube between the two balls.

This invention relates to a support for a rear vision mirror panel and more particularly to such a rear vision mirror which has a wide range of adjustment for positioning and aiming the same. Another feature of the invention resides in its support from a base which can be cemented directly to the windshield of the automobile, a rear vision mirror so mounted requiring such wide range of adjustment to be adaptable to drivers of different height and in different positions and to be capable of being accurately aimed to reflect the desired view through the rear window of the automobile.

The present trend toward windshields having a pronounced back sweep results in the top part of the windshield being at an angle of 40° to the horizontal and extending well back along the roof of the automobile. This complicates the problem of mounting an inside rear vision mirror on the frame of the automobile since it is desirable to have the rear vision mirror near the center of the car and above but well in front of the eyes of the driver. It has been heretofore proposed to mount the rear vision mirror directly on the glass windshield by cementing its base to the windshield. However, even doing so, it is desirable to provide a wide range of positions, both laterally and vertically, and also about its vertical and longitudinal axes, for the rear vision mirror panel to suit drivers of different heights and positions, some drivers requiring their seat to be moved considerably further forward than others for convenient operation of foot pedals and the steering wheel.

It has been found desirable that the base for such a rear vision mirror be cemented on the windshield by the windshield maker, and under these circumstances it is desirable to have the base shallow to facilitate nesting of the maximum number of windshields in a given space for storing and packing.

It is an object of the present invention to provide a support for a rear vision mirror including a base having one face adapted to be cemented to the inside of a glass windshield in which the base projects such short distance from the windshield that it does not interfere with present normal cartoning of windshields.

It is another object of the invention to provide such a mounting in which the attachment of the rear vision mirror assembly to the base is accomplished without screws and is effected by the simple expedient of bringing the rear vision mirror assembly to proper position, together with a simple spring plate, and then sliding the two into an undercut groove provided in the base, the spring plate automatically latching the rear vision mirror assembly is supported position.

Another object of the invention is to provide a rear vision mirror mounting which provides a wide range of both positioning and aiming of the rear vision mirror panel, this being accomplished by a double ball jointed arm supporting the rear vision mirror panel on the base.

Another object is to provide such a double ball joint mounting which is simple, inexpensive and in which both balls can be frictionally seated with the same pressure so as to offer equal resistance to adjustment and so as to provide a vibration free mounting for the mirror panel.

Another object is to provide such a double ball joint mounting in which the torque or frictional resistance at either ball joint can be preset to have any value, greater or less, than that of the companion ball joint, so that the mirror panel can be easily aimed, for example, with little likelihood of disturbing its vertical or lateral positioning.

Another object of the invention is to provide such a rear vision mirror assembly which, except for the base, can be prefabricated and, as indicated above, quickly applied to the base at the automobile assembly plant.

Another object is to provide such a mounting which is attractive in appearance and provides a desirable accessory conforming to the swept back windshields.

In the accompanying drawing, FIG. 1 is a fragmentary vertical section through the upper part of a swept back windshield and showing, in side elevation, a rear vision mirror support embodying the present invention; FIG. 2 is an enlarged fragmentary vertical longitudinal section through the support; FIGS. 3, 4 and 5 are transverse sections taken on the correspondingly numbered lines in FIG. 2; FIG. 6 is a diminutive view similar to FIG. 2 and illustrating a modified form of the invention.

The rear vision mirror support forming the subject of the present invention is particularly adapted to be used in conjunction with an automobile having a windshield 10 the upper part of which has the pronounced sweep back illustrated in FIGS. 1 and 2. To mount the rear vision mirror panel 11 on the windshield 10 the support includes a diecast metal base 12 having a generally round flat face 13 united to the inside face of the windshield 10 by a layer of cement 14. The opposite face 15 of the base is provided with an undercut straight slot indicated generally at 16 extending from its bottom edge toward its center and including a narrow outside part **16*a* and a broad inside part 16*b*. The support for the rear vision mirror panel 11 includes a first ball 18 having a first integral neck 19 fixed at one end thereto and a supporting plate 20 fixed to the opposite end of the neck 19 and formed integrally therewith to project laterally and having one broad face 21 opposing the first ball 18. The opposite broad face of this plate 20, that is, the one opposing the windshield 10, is indicated at 22. The outside part 16*a* of the undercut slot 16 is of a width slightly greater than the width of the first neck 19, and the inside part 16*b* of the slot 16 is of a width slightly greater than the width of the supporting plate 20 and has depth sufficient to receive the opposite edges of this supporting plate 20 so that the neck and supporting plate can be inserted into the undercut slot 16 from the bottom of the base with the face 21 of the supporting plate sliding along the undercut face 23 of the inside part 16*b* of the slot 16**.

To releasably retain the integral first ball, first neck and supporting plate 18, 19 and 20 in the slot 16, a spring plate 25 is provided, this being in the form of a concavo-convex plate, preferably of arching form, which yields in the direction normal to its broad surfaces. This spring plate has a hole 26 at its center, preferably, but not necessarily, in the form of a through opening, and which is adapted to fit around a rounding protuberance 28 formed on the broad face 22 of the supporting plate 20 remote from the first ball 18. The inside part **16*b* of the slot 16 is of sufficient depth, lengthwise of the neck 19, to receive both the supporting plate 20 and also the spring plate 25 with the latter in a stressed condition so as to frictionally hold the face 21 of the supporting plate 20 against the undercut face 23 of the slot 16** and provide a reliable mounting for the rear vision mirror assembly which will, however, permit the rear vision mirror assembly to be released when struck a violent blow, as in the event of an accident.

The support for the rear vision mirror panel 11 also includes a second ball 30 with a second neck 31 fixed thereto and connecting the second ball 30 with the rear vision mirror panel 11, this being shown as being done by means of a sheet metal case 32, connected in any suitable manner to the neck 31 and forming a bezel 33 for the rim of the rear vision mirror panel 11. In the form of the invention shown in FIGS. 1–5, this connection of the neck 31 is to the back of the case 32 and a sheet metal tube 35 houses the first ball 18 at one end with the first neck 19 projecting outwardly therefrom, this one end of the tube 35 being contracted in diameter, as indicated at 36, and being formed to provide a spherical seat 38 for the side of the first ball 18 from which the first neck 19 projects. The tube 35 houses the second ball 30 at its other end with the second neck 31 projecting outwardly therefrom, and this other end of the tube 35 is contracted in diameter, as indicated at 39, and formed to provide a spherical seat 40 for the side of the second ball 30 from which the second neck 31 projects. A helical compression spring 41 is arranged in the tube 35 and is operatively connected with the two balls 18 and 30 by cup-shaped follower disks 42 and 43 interposed between each ball and the corresponding end of the helical compression spring 41 with each ball fitted in the concavity of its follower disk and the helical compression spring 41 bearing axially against the rim portion thereof.

The entire rear vision mirror assembly including the two balls 18, 30, the tube 35 and the supporting plate 20 and button 28 are preassembled, the contracted portions 36, 39 of the tube 35 forming the spherical seats 38, 40 for the two balls 18, 30 being preferably done by magnetic field forming with its parts in position, although, of course, it could be done by mechanical swaging or roll forming.

The base 12 is cemented to the windshield 11 by the maker of the windshield. At the automobile assembly plant, after the windshield has been placed in the body of the automobile, the rear vision mirror installer places a spring metal disk 25 with its convex side against the face 22 of the supporting plate 20 and with its opening 26 around the protuberance 28 and slips the parts so held upwardly into the undercut groove 16, the first neck 19 of the first ball 18 sliding up in the narrow outside part **16*a* of this groove and the supporting plate 20 and spring plate 25 sliding up in the broad inside part 16*b* of the undercut groove. In so doing the spring plate 25 is distorted axially of its opening 26 so that its edges engage the bottom of the broad inside part 16*b* of the groove and so that it forces the face 21 of the supporting plate 20 into firm engagement with the undercut face 23 of the groove 16**. The spring pressure is sufficient to provide a firm and vibration free mounting for the rear vision mirror assembly and which prevents the rear vision mirror assembly from falling out under any normal condition.

The tube 35 and double ball connection between the mirror panel 11 and base 12 provides a wide range for positioning and aiming the mirror panel, but it will particularly be noted that since the ball seats 38 and 40 are identically formed and since the seat pressure of the balls against these seats is equal, due to the fact that they are served by the common helical compression spring 41, both ball joints have equal frictional resistance to being readjusted thereby to facilitate positioning and aiming of the mirror by merely seizing the bezel 31 of the mirror panel 11 and moving it to proper position without encountering a high point of resistance in either of the ball joints.

The modified form of the invention shown in FIG. 6 illustrates the manner in which the torque or frictional resistance against the surface of either ball can be preset to have any value, greater or less, than that of the other ball. As illustrated in FIG. 6 the windshield 10 is shown as having its upper edge sealed against the roof frame 45 of the automobile, this roof frame being illustrated as having a flange 46 projecting into the windshield opening and as fitting into the rubber rim or frame 48 of the windshield 10 in a manner to obtain a substantially weather-tight mounting for the windshield.

Instead of being secured directly to the windshield 10 the diecast metal base 12 is secured, as by the layer of cement 14, directly to the roof frame 45 so that its outer face 15 is generally horizontal. The first ball 18 has its stem 19 secured in the base 12 in the same manner as illustrated in FIGS. 2–5, and hence description of this mounting will not be repeated. However, the second ball is shown as being of smaller diameter than this first ball 18, and hence is designated as **30*a* to distinguish it from the ball 30 of the form of the invention shown in FIGS. 1–5 which is the same size as the ball 18. The second neck 31*a* of the ball 30*a* extends through and is secured to the top of the case 32 of the mirror panel 11** instead of through the back of this case as with the form of the invention shown in FIGS. 1–5.

A sheet metal tube **35*a* has an upper end 49 of larger diameter which houses the first ball 18 with the neck 19 projecting outwardly therefrom, the extremity of this one end 49 of the tube 35*a* being contracted in diameter, as indicated at 36*a* and being formed to provide a spherical seat 38*a* for the side of the first ball 18 from which the first neck 19 projects. The opposite end 50 of the tube 35*a* is of smaller diameter than the end 49 and houses the smaller second ball 30*a* with the neck 31*a* projecting outwardly therefrom, and this other end 50 of the tube 35*a* is contracted in diameter as indicated at 39*a*, and formed to provide a spherical seat 40*a* for the side of the second ball 30*a* from which the neck 31*a*** projects.

A cylindrical wooden abutment plug 51 is arranged in the center of the tube **35*a* and preferably snugly fitted therein so as to be immobile and be held in a predetermined position. A larger helical compression spring 52 is arranged in the larger end 49 of the tube 35*a* between a washer 53 at the end of the wooden plug 51 and a cup-shaped follower disk 54 fitted with its cavity against the larger ball 18. A helical compression spring 55 is arranged in the smaller end 50 of the tube 35*a* and is interposed between the end of the cylindrical plug 51 and a cup-shaped follower disk 56, the cavity of which is fitted against the smaller ball 30*a*. The helical compression spring 52 and its cup-shaped follower 54 are of larger size than the spring 55 and follower 56 and exert greater frictional pressure against the larger ball 18 than the spring 55 and follower 56 exert against the ball 30*a*. Hence the torque or frictional resistance against the larger ball 18 is greater than the torque or frictional resistance against the smaller ball 30_a_. Accordingly the mirror panel 11 and its case 32 can be easily aimed by moving it about its own vertical or horizontal axes intersecting the smaller ball 30_a_ without likelihood of disturbing the adjustment of the tube 35_a_ about the larger ball 18. However, if proper adjustment also requires repositioning the entire mirror and its case to one side or the other, or up or down, the tube 35_a_ can be adjustably swung around the larger ball 18 to locate the mirror panel in the desired position, following which it can be reaimed by adjustment about the lesser resistance or torque smaller ball 30**_a_.

From the foregoing it will be seen that the present invention achieves the objectives and has the advantages initially set forth.

We claim:

1. A support for supporting a rear vision mirror assembly from the glass windshield of a vehicle, comprising a ball, means frictionally supporting said rear vision assembly on the surface of said ball to provide a universal adjustment therefor about said ball, a neck fixed at one end to and projecting outwardly from said ball, a supporting plate fixed to the opposite end of said neck and arranged to project laterally therefrom with one broad surface opposing said ball, a base having one broad face adapted to be secured directly to the inside face of said windshield and having an undercut straight slot in its opposite face extending from one side toward its center and including a narrow outside part in said opposite face of a width slightly greater than the width of said neck and a broad inside part of a width slightly greater than the width of said supporting plate and a depth sufficient to receive the opposite edges of said supporting plate whereby said neck and supporting plate can be inserted into said undercut slot from said one side of said base, and spring means in said undercut slot interposed between said supporting plate and base and retaining said supporting plate and neck in said undercut slot.

2. A support as set forth in claim 1 wherein said one side of said base is its bottom.

3. A support as set forth in claim 1 wherein said spring means is in the form of a concave spring plate engaging the side of said supporting plate remote from said ball.

4. A support as set forth in claim 3 wherein said concave spring plate is provided with a central hole and wherein said supporting plate is centrally provided with a rounding protuberance snugly fitted in said hole.

5. A support for supporting a rear vision mirror panel from a first ball fixed to a first neck adapted to be carried by a supporting base, said rear vision mirror including a second ball and a second neck fixed thereto and connecting said second ball with the rear vision mirror panel, comprising a one piece metal tube housing said first ball at one end with said first neck projecting outwardly therefrom, said one end of said one piece tube being contracted in diameter and formed to provide an integral spherical seat for the side of said first ball from which said first neck projects, said one piece tube housing said second ball at its other end with said second neck projecting outwardly therefrom, said other end of said one piece tube being contracted in diameter and formed to provide an integral spherical seat for the side of said second ball from which said second neck projects whereby at least one of said contracted ends must be formed against the ball contained therein by magnetic field forming, swaging or roll forming, and at least one helical compression spring means in said one piece tube and operatively connected with said balls to urge them apart.

6. A support for supporting a rear vision mirror panel from a first ball fixed to a first neck adapted to be carried by a supporting base, said rear vision mirror including a second ball and a second neck fixed thereto and connecting said second ball with the rear vision mirror panel, comprising a tube housing said first ball at one end with said first neck projecting outwardly therefrom, said one end of said tube being contracted in diameter and formed to provide a spherical seat for the side of said first ball from which said first neck projects, said tube housing said second ball at its other end with said second neck projecting outwardly therefrom, said other end of said tube being contracted in diameter and formed to provide a spherical seat for the side of said second ball from which said second neck projects, an abutment arranged in said tube centrally thereof, a first helical compression spring operatively interposed between said first ball and the corresponding end of said abutment and a second helical compression spring interposed between said second ball and the opposite end of said abutment and a cup-shaped follower disk interposed between each ball and the corresponding helical compression spring with each ball fitted in the concavity of its follower disk and the corresponding helical compression spring bearing axially against the rim portion thereof.

7. A support as set forth in claim 6 wherein said abutment is in the form of a wooden plug.

8. A support as set forth in claim 6 wherein said first ball and first helical compression spring are larger than said second ball and second helical compression spring whereby there is greater frictional resistance to movement of said tube about said second ball than of said rear vision mirror panel about said second ball.

References Cited

UNITED STATES PATENTS

| | | | |
|---|---|---|---|
| 1,382,783 | 6/1921 | Howard | 248—276 |
| 2,102,012 | 12/1937 | Hodny | 248—483 |

ROY D. FRAZIER, *Primary Examiner.*

CHANCELLOR E. HARRIS, *Examiner.*

F. DOMOTOR, *Assistant Examiner.*